No. 633,993. Patented Oct. 3, 1899.
J. W. GRAVES.
COTTON GIN.
(Application filed Feb. 8, 1898.)
(No Model.) 10 Sheets—Sheet 1.

Fig. 1.

No. 633,993. Patented Oct. 3, 1899.
J. W. GRAVES.
COTTON GIN.
(Application filed Feb. 8, 1898.)
(No Model.) 10 Sheets—Sheet 3.

Fig. 3.

Witnesses:
H. S. Rohrer
A. F. Dennis

Inventor:
John W. Graves,
by Russell Goldsborough,
Attorneys.

No. 633,993. Patented Oct. 3, 1899.
J. W. GRAVES.
COTTON GIN.
Application filed Feb. 8, 1898.
(No Model.) 10 Sheets—Sheet 5.

Witnesses:
H. S. Rohrer.
A. F. Dennis.

Inventor:
John W. Graves,
by Semmes & Goldsborough,
Attorneys.

No. 633,993. Patented Oct. 3, 1899.
J. W. GRAVES.
COTTON GIN.
(Application filed Feb. 8, 1898.)
(No Model.) 10 Sheets—Sheet 6.

Fig. 8.

No. 633,993. Patented Oct. 3, 1899.
J. W. GRAVES.
COTTON GIN.
(Application filed Feb. 8, 1898.)
(No Model.) 10 Sheets—Sheet 7.

Fig. 9.

Witnesses:
H. S. Rohrer.
A. F. Dennis.

Inventor:
John W. Graves,
by Pennie & Goldsborough,
Attorneys.

No. 633,993. Patented Oct. 3, 1899.
J. W. GRAVES.
COTTON GIN.
(Application filed Feb. 8, 1898.)

(No Model.) 10 Sheets—Sheet 8.

Fig. 10.

Witnesses:
H. S. Rohrer.
A. F. Dennis.

Inventor:
John W. Graves,
By Munn & Goldsborough,
Attorneys.

No. 633,993. Patented Oct. 3, 1899.
J. W. GRAVES.
COTTON GIN.
(Application filed Feb. 8, 1898.)

(No Model.) 10 Sheets—Sheet 9.

Fig. 11.

Attest:
P. H. Schott
A. F. Dennis.

Inventor:
John W. Graves,
by Penrie & Goldsborough
Attys

Fig. 12.

UNITED STATES PATENT OFFICE.

JOHN W. GRAVES, OF LITTLE ROCK, ARKANSAS.

COTTON-GIN.

SPECIFICATION forming part of Letters Patent No. 633,993, dated October 3, 1899.

Application filed February 8, 1898. Serial No. 669,601. (No model.)

*To all whom it may concern:*

Be it known that I, JOHN W. GRAVES, a citizen of the United States, residing at Little Rock, in the county of Pulaski and State of Arkansas, have invented certain new and useful Improvements in Cotton-Gins; and I do hereby declare the following to be a full, clear, and exact description of the invention, such as will enable others skilled in the art to which it appertains to make and use the same.

My invention relates to certain new and useful improvements in cotton-gins, its salient features consisting, first, in providing a flexible or spring-supported gin-breast, so arranged within the gin-chamber as to have a capacity for advancing or receding bodily in accordance with the varying size of the body of cotton within the said chamber, whereby the cotton is maintained constantly in contact with the picker-pins of the float or with the saws themselves when the float is dispensed with; secondly, in providing a float of general cylindrical contour in combination with a flexible and spring-supported gin-breast concentric therewith, whereby the seed-cotton is presented, to great advantage, to the action of the gin-saws; thirdly, in providing rotatory ribs for the gin-saws, so as to obviate danger of choking or clogging of the coacting parts; fourthly, in providing a plurality of series of individual gin-saws, each series having an alternate series of rotatory ribs coöperating with the adjoining series of saws, and, fifthly, in providing a grid for temporarily detaining the seed as they issue from the gin-chamber and subjecting them to the further action of the saws until completely delinted.

The invention furthermore consists in the certain specific details of construction and combinations of parts involved in the practical embodiment of the features referred to, as will hereinafter more fully appear.

In the accompanying drawings.

Similar numerals of reference indicate similar parts throughout the several views.

Referring to the drawings, 13 indicates main body portion of the apparatus, supported upon suitable legs or standards in the usual manner, and having the customary moteboard and the lint-cotton-exit flue or trunk, familiar to the art.

14 indicates the cleaner-brush, located at the rear of the slotted board 15 and fast upon the shaft 16, which is rotated by a pulley 17 in the direction indicated by the arrow.

Figure 1:
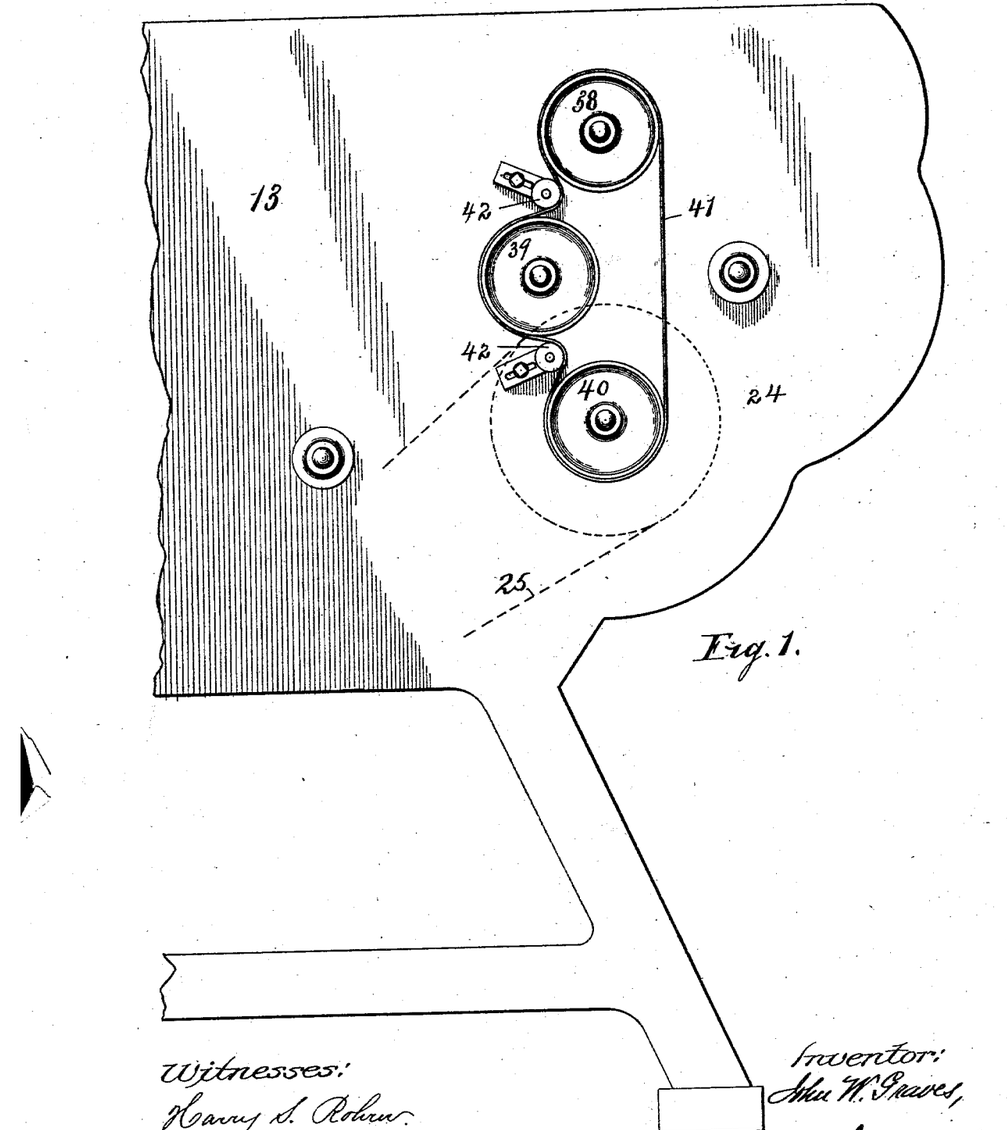
Figure 1 represents in elevation one side of that portion of a cotton-gin to which my improvements appertain.
Figure 2:
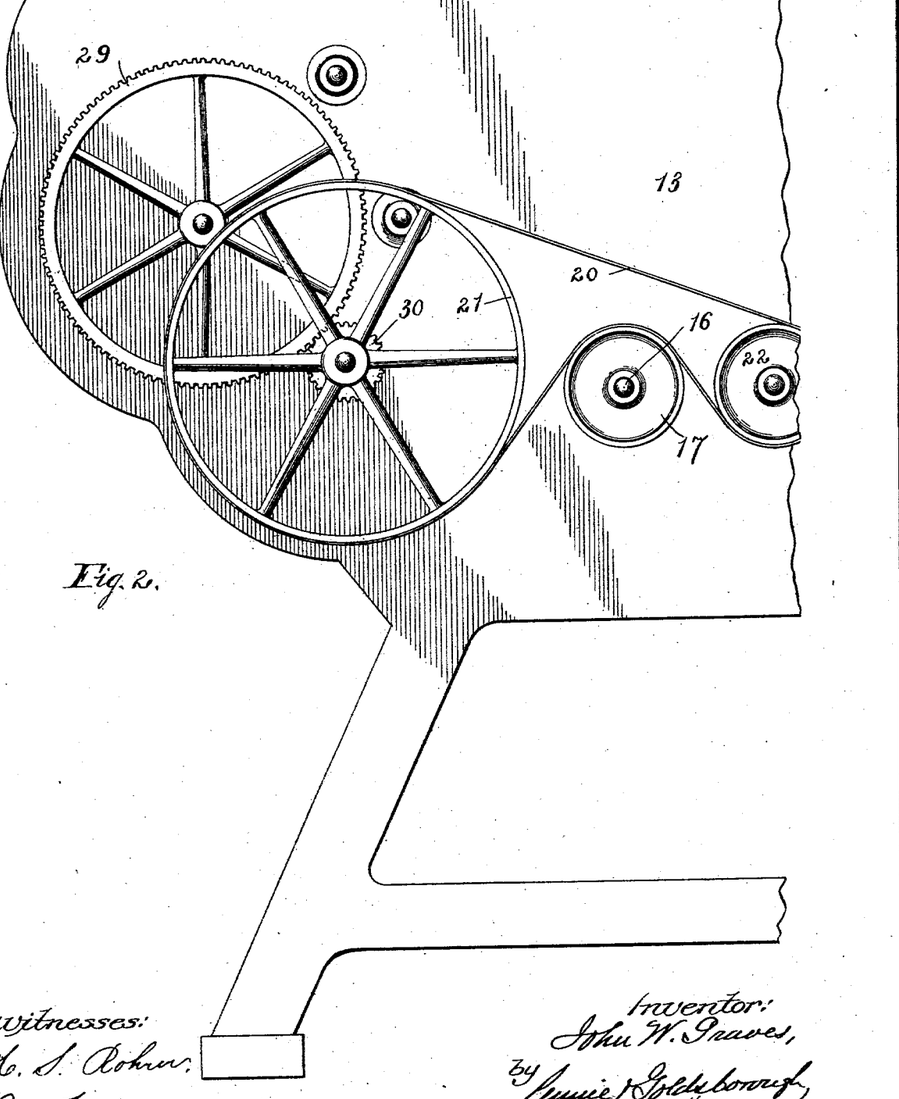
Fig. 2 represents a like view of the other side thereof.
Figure 3:
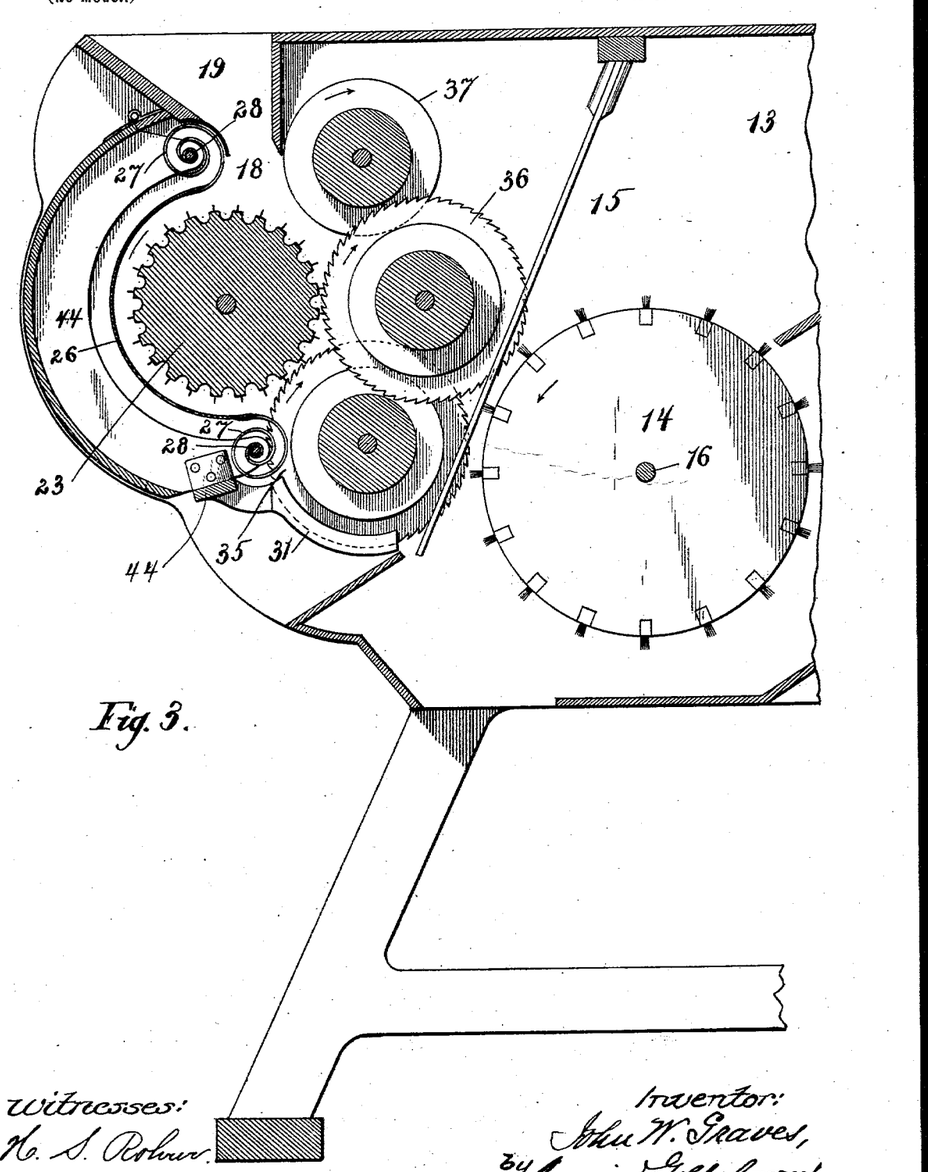
Fig. 3 represents a central longitudinal section thereof.

In front of the slotted board 15 are located the gin-saws and in front of the gin-saws is located the chamber 18 for the reception of the seed-cotton, which gains admission thereto through the hopper 19. In order to impart the proper relative rotation to the cleaner-brush 14, a driving-belt 20 passes from a saw-shaft pulley 21 over an idler 22 and over the top of the pulley 17 of the cleaner-brush shaft. The saw-shaft upon which the pulley 21 is mounted may be conveniently actuated by a pulley 24 and driving-belt 25 at the opposite side of the apparatus, as shown in Fig. 1.

Figure 8:
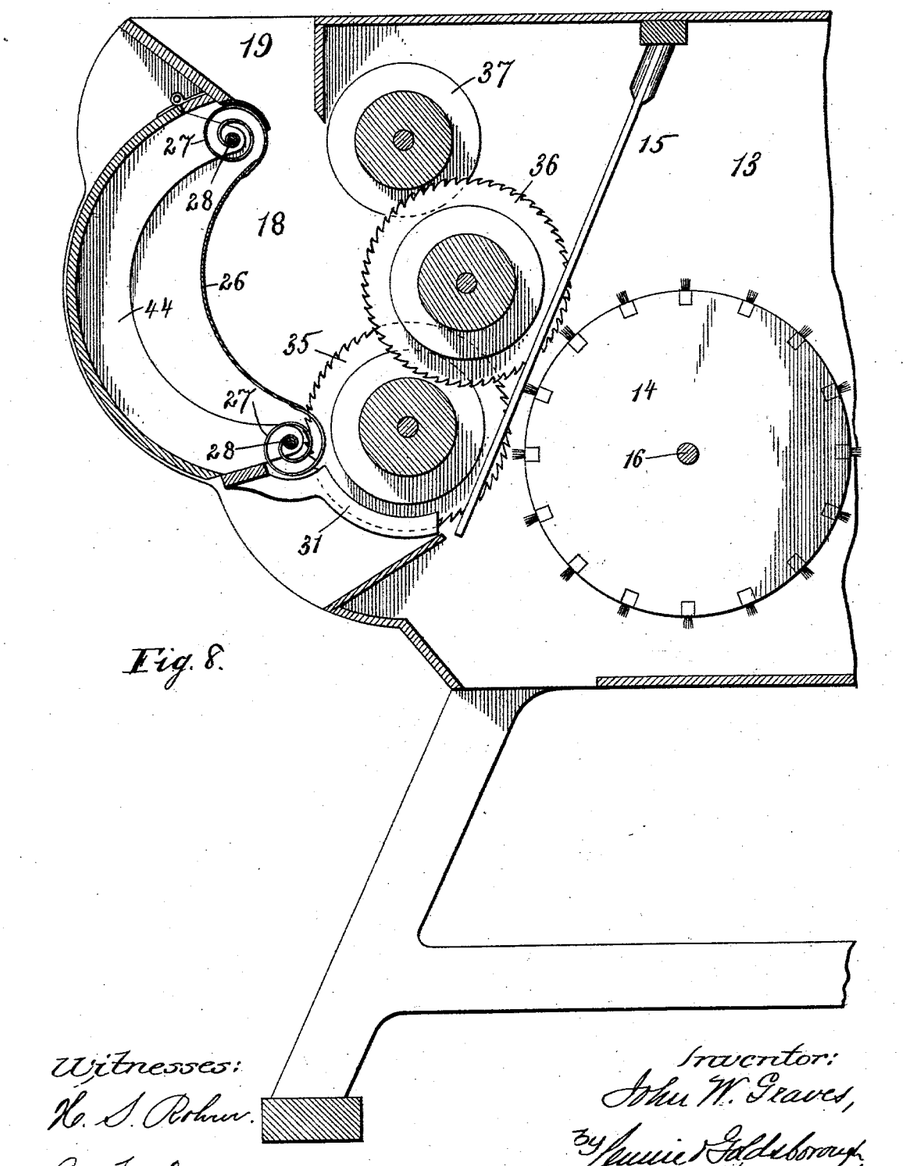
Figs. 8, 9, 10, 11, and 12 represent, respectively, central longitudinal sections of modified forms of the apparatus.
Figure 9:
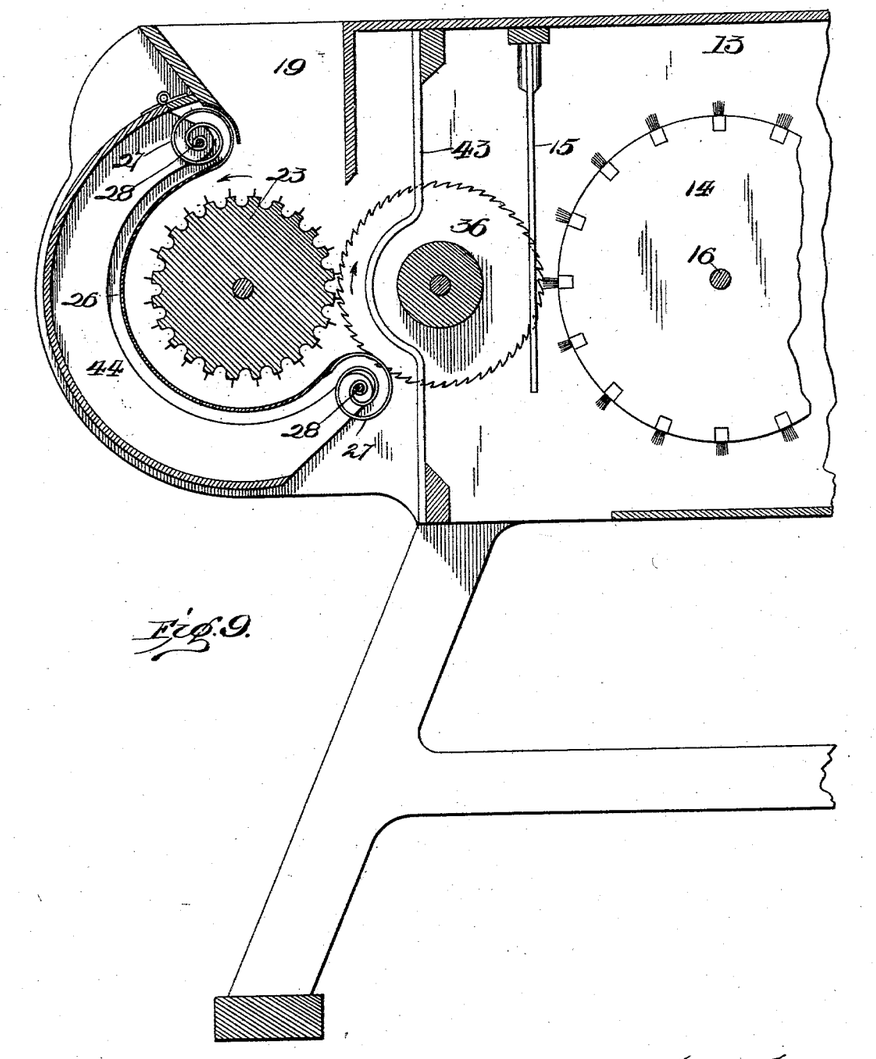
Figure 10:
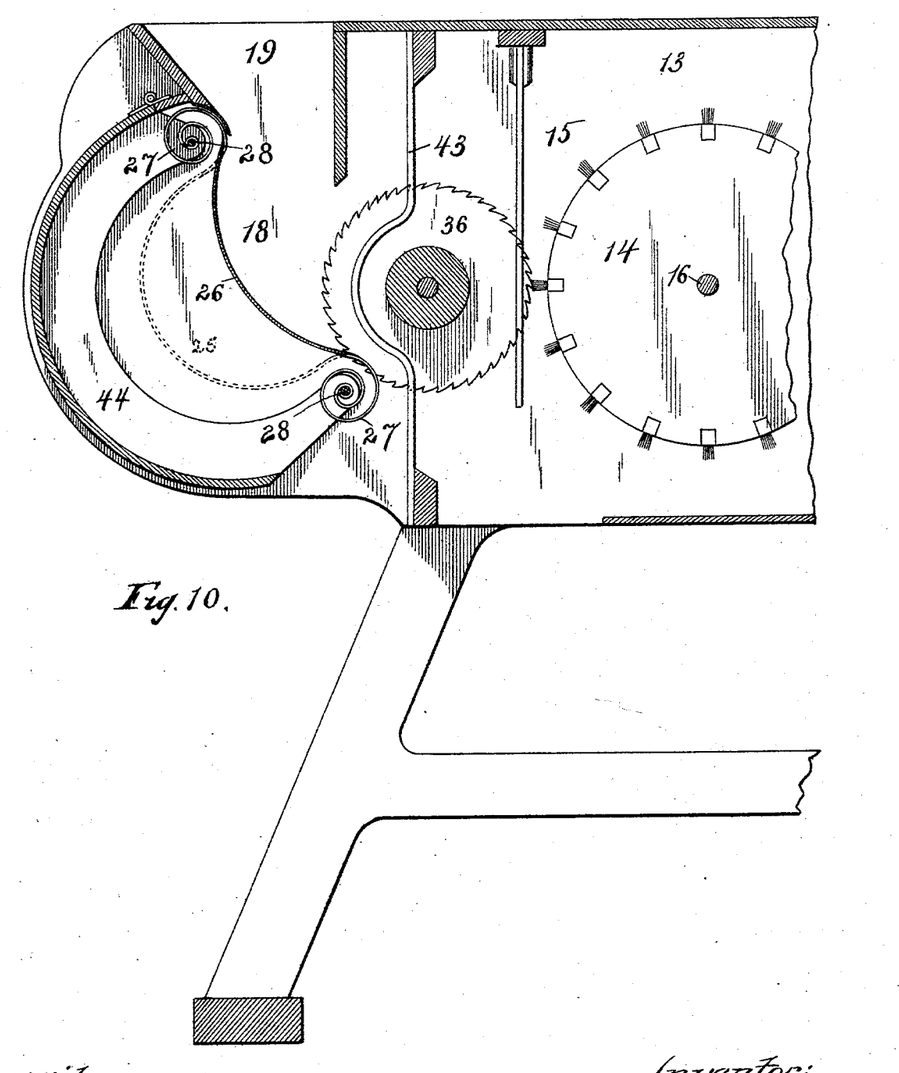
Figure 11:
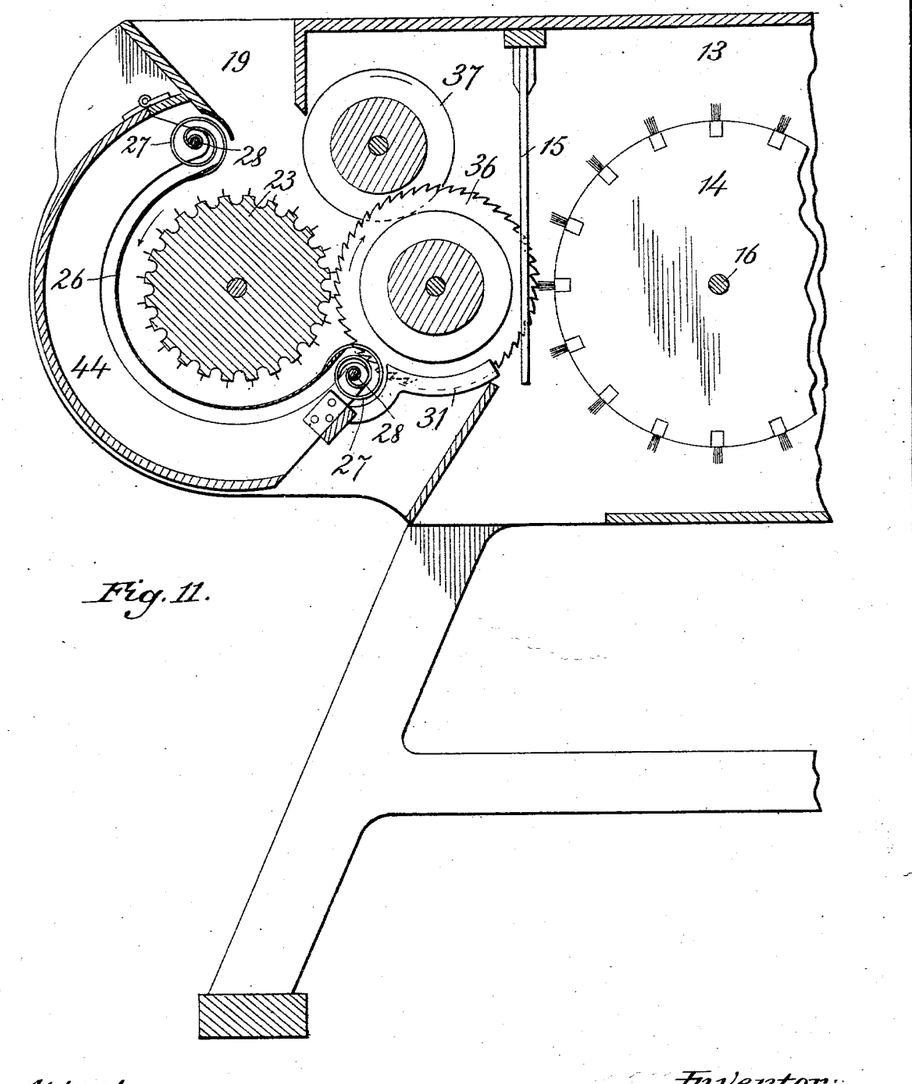
Figure 12:
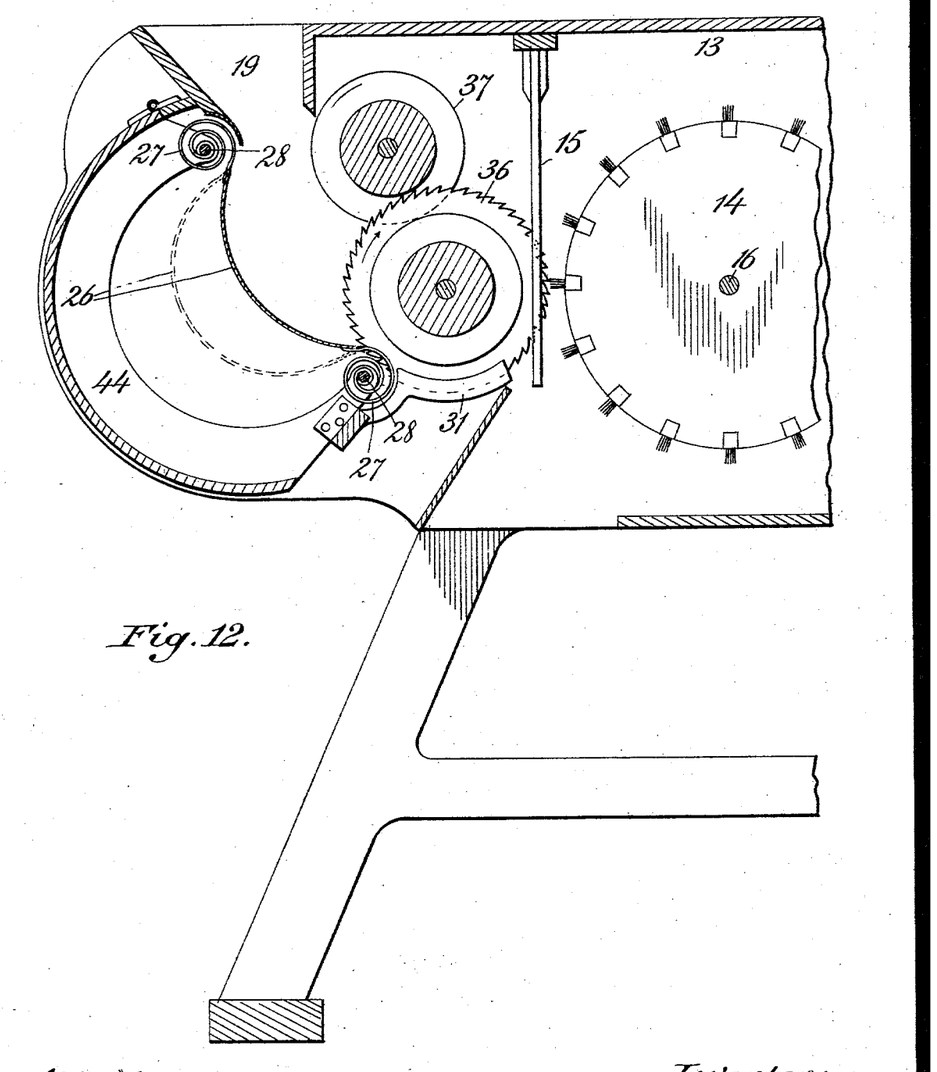

The several modifications of my invention have in common the feature of a flexible or spring-supported breast 26, which is mounted to move bodily in a direction substantially radial to the center of chamber 18. In the preferred forms of my invention I sustain the breast both at top and bottom and upon volute springs 27, secured at their inner ends to fixed anchor-rods 28 and connected at their outer ends to the breast. Where, as in the constructions shown in Figs. 8, 10, and 12, the chamber 18 is devoid of a float, the flexible breast holds the varying body of seed-cotton against the saws with an elastic pressure, advancing or receding bodily as the said body of cotton decreases or increases in size. Where, as in Figs. 3, 4, 9, and 11, a float is employed, the flexible breast is concentric therewith and forms a throat or passage-way at the front side of the float, through which the seed-cotton is conducted on its way to the saws. In this instance, also, it is adapted to advance and recede bodily, holding the seed-cotton with an elastic pressure against the teeth or projections of the float and accommodating itself to any variations in the supply.

The float consists of a main body portion 23 of general cylindrical form, adapted to rotate within the gin-chamber 18 and actuated by a gear 29 from a pinion 30 upon the gin-saw shaft in such manner as to rotate in the opposite direction to the gin-saws. It is grooved or otherwise provided with peripheral longitudinal channels or recesses with intervening ridges, from which project series of stiff metallic pins or fingers, as shown. These pins or fingers serve not only as conveyers to carry the cotton along the breast, but they deliver it to the gin-saws and coöperate therewith, inasmuch as the teeth of the individual saws pass between corresponding circular series of pins, as indicated clearly in Fig. 4. The seed themselves as they become delinted occupy first the longitudinal grooves or pockets and continuously drop therefrom upon a grid or grating formed, preferably, of a series of bars 31, concentric with the proximate series of saws and separated by intervening spaces, within which the saws rotate. The bars may conveniently be formed integral with a common back piece 32, having projections or lugs, as 33, for attachment, say, to a frame 44, connected with the hinged front wall of the apparatus. In order to provide the recesses between the bars with sloping walls, they are conveniently ridged or of triangular cross-section, as indicated. The intervals between the bars 31 are of such dimensions as to retain the seed therein until any still-adhering lint shall have been detached by the continued action of the saws, whereupon the thoroughly-delinted seed pass through the grid-openings and make their exit at the front of the machine.

Figure 4:
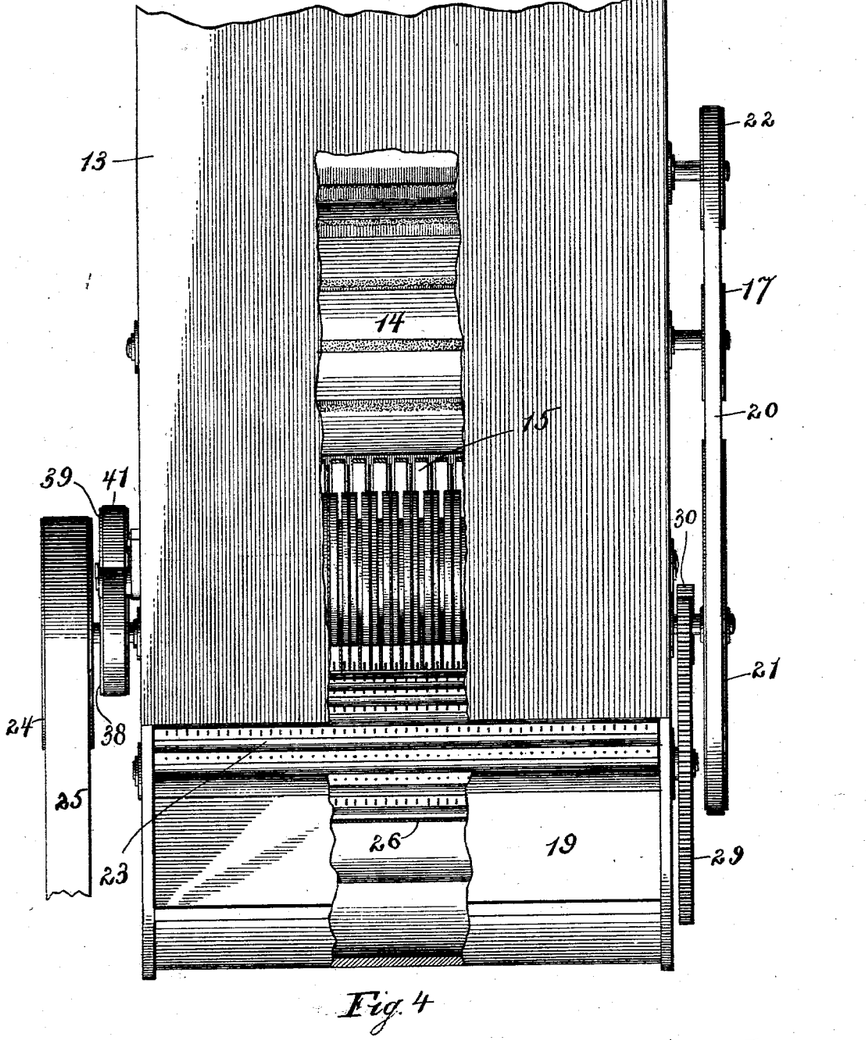
Fig. 4 represents a top plan view thereof, partly broken away.
Figure 5:
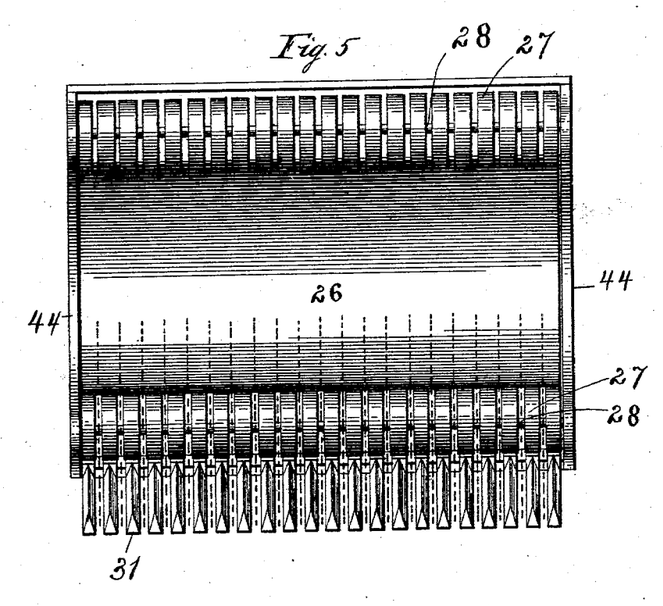
Fig. 5 represents a top plan view of the spring-supported breast and the seed-grid, indicating also in dotted lines the location of the saws with respect thereto.
Figure 6:
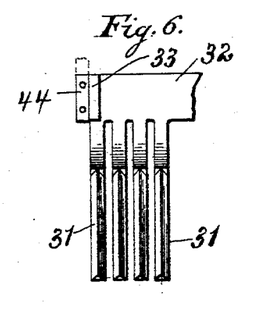
Fig. 6 represents a detached plan view of a portion of the grid.
Figure 7:
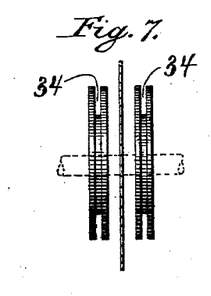
Fig. 7 represents in elevation one of the gin-saws, together with the adjacent rotatory ribs.

The individual saws are of the usual pattern; but they are separated from each other by rotatory ribs, likewise secured to the saw-shaft and which may be conveniently provided by dividing the customary space-blocks so as to form peripheral grooves or recesses 34 therein. (See Figs. 4 and 7.) In some of the modifications herein shown these rotatory ribs upon a lower series of saws 35 coöperate with the saws 36 of an upper series, which latter series has a like number of similar rotatory ribs coöperating with the saws of the lower series. It will thus be evident that the two series of saws, dispensing with the usual stationary ribs, coöperate with ribs which because of their rotatory motion are continuously freeing themselves from all danger of being clogged or choked by an accumulation of detained or imprisoned cotton. In order to provide sufficient space for obtaining the effective action of the rotatory ribs, I so locate them upon the shaft that the distance between the central planes of each two proximate rib-grooves shall be preferably one and a quarter inches. The upper series of saws (or if but one series is employed then that one) coöperate with a supplemental series of rotatory ribs 37 upon a shaft which is actuated by a pulley 38. As indicated in Figs. 1 and 4, the pulley 38 together with the pulleys 39 40 of the saw-shafts are rotated in the same direction by means of a driving-belt 41, having conveniently the adjustable belt-tightening rollers 42, as shown.

In order to illustrate the scope of my invention, I have devised a number of modifications showing, for instance, the omission of the rotatory ribs and the employment of stationary ribs 43, (see Figs. 9 and 10;) furthermore the omission of the float, the omission of one of the series of saws, and the omission of the seed-grid in other instances. While, therefore, I prefer to employ conjointly all of these instrumentalities, I have thought it appropriate to clearly indicate the entire feasibility of using them separately wherever they may be individually utilizable to advantage.

Having thus described my said invention, what I claim is—

1. In a cotton-gin, a breast, spring-supported at both top and bottom, so as to recede or advance bodily in accordance with the varying size of the roll.

2. In a cotton-gin, a breast, spring-supported at both top and bottom, so as to recede or advance bodily in accordance with the varying size of the roll, said breast being concave.

3. In a cotton-gin, a breast, spring-supported at both top and bottom, so as to recede or advance bodily in accordance with the varying size of the roll, said breast being concave, the path of movement of the longitudinal center of the concave being radial to the center of the breast-chamber.

4. In a cotton-gin, the combination with the breast, of volute-spring extensions from which the breast is suspended.

5. In a cotton-gin, the combination with the breast, of volute-spring extensions from which the breast is suspended at both top and bottom.

6. In a cotton-gin, the combination with the breast, of volute-spring extensions from which the breast is suspended, said volute-spring extensions consisting of two independent series, one at the top and the other at the bottom of the breast.

7. In a cotton-gin, the combination with a float, of a flexible breast exterior thereto and concentric therewith, said breast being spring-supported at both top and bottom.

8. In a cotton-gin, the combination with a float, of a flexible breast exterior thereto and concentric therewith, said breast being supported at top and bottom by volute springs.

9. In a cotton-gin, the combination with a float consisting of a roller having a series of longitudinal surface channels or grooves, and intermediate conveying-pins, of a breast concentric with the roller and spring-supported at its ends.

10. In a cotton-gin, the combination with a float consisting of a roller having a series of longitudinal surface channels or grooves, and intermediate conveying-pins, of a spring-supported breast concentric with the roller, the spring-supports consisting of volute springs at both the top and bottom of the breast.

11. In a cotton-gin, the combination with the gin-saws, of a substantially horizontal series of ribs underlying the saws and separated from each other by intervening spaces within which the saws operate above the lower edge of said ribs, said series of ribs being supported at the exit of the breast-chamber and serving as a grid or screen within which the seeds issuing from the breast-chamber are detained until delinted by the further action of the saws.

12. In a cotton-gin, the combination with the gin-saws, of a substantially horizontal series of ribs underlying the saws and separated from each other by intervening spaces within which the saws operate, said ribs being supported at the exit of the breast-chamber and being triangular in cross-section and having their apices extending between the saws.

13. In a cotton-gin, the combination with the breast-chamber, of gin-saws coöperating therewith, and a series of curved ribs triangular in cross-section, supported at the exit of the breast-chamber and concentric with the saws, the apices of the ribs extending into the spaces between the saws.

14. In a cotton-gin, a plurality of series of gin-saws arranged adjacent to each other, each series being provided with an alternate series of divided ribs coöperating with the gin-saws of the other series.

15. In a cotton-gin, a plurality of series of gin-saws arranged adjacent to each other, each series being provided with an alternate series of divided ribs coöperating with the gin-saws of the other series, and an auxiliary series of rotatable ribs for the upper gin-saws.

16. In a cotton-gin, a series of individual saws, a shaft upon which said saws are mounted, and an alternate series of divided ribs, also mounted upon the shaft.

17. In a cotton-gin, the combination with a longitudinally-grooved rotatable float, of a concentric spring-supported breast, a plurality of series of gin-saws coöperating with the float, each series of saws being provided with an alternate series of divided ribs, engaging the other series of saws.

18. In a cotton-gin, the combination with a longitudinally-grooved rotatable float, of a concentric spring-supported breast, a plurality of series of gin-saws coöperating with the float, each series of saws being provided with an alternate series of divided ribs, engaging the other series of saws, and auxiliary rotatable ribs for the upper series of saws.

19. In a cotton-gin, the combination with a longitudinally-grooved rotatable float, of a concentric spring-supported breast, a plurality of series of gin-saws coöperating with the float, each series of saws being provided with an alternate series of divided ribs, engaging the other series of saws, and a grid below the lower series of saws said grid being composed of curved bars triangular in cross-section, the ridges of said bars extending between the saws.

20. In a cotton-gin the combination of a substantially horizontal series of ribs separated from each other by intervening spaces, and gin-saws projecting into the spaces between the ribs, the edge of the saws working in said spaces above the lower edge of the ribs.

In testimony whereof I affix my signature in presence of two witnesses.

JOHN W. GRAVES.

Witnesses:
JOHN C. PENNIE,
HUGH M. STERLING.